US009435529B2

(12) United States Patent
Bradley, Jr.

(10) Patent No.: US 9,435,529 B2
(45) Date of Patent: *Sep. 6, 2016

(54) CONCEALED VACUUM AIR FLOW REFLECTOR LIGHT FIXTURE

(71) Applicant: Growlite, Inc., Phoenix, AZ (US)

(72) Inventor: Aubrey Ray Bradley, Jr., La Habra, CA (US)

(73) Assignee: Growlite, Inc., Phoenix, AZ (US)

( * ) Notice: Subject to any disclaimer, the term of this patent is extended or adjusted under 35 U.S.C. 154(b) by 204 days.

This patent is subject to a terminal disclaimer.

(21) Appl. No.: 14/194,439

(22) Filed: Feb. 28, 2014

(65) Prior Publication Data

US 2014/0177204 A1 Jun. 26, 2014

Related U.S. Application Data

(63) Continuation-in-part of application No. 13/106,772, filed on May 12, 2011, now Pat. No. 8,702,283.

(60) Provisional application No. 61/451,892, filed on Mar. 11, 2011.

(51) Int. Cl.

| F21V 29/00 | (2015.01) |
|---|---|
| F21V 29/505 | (2015.01) |
| A01G 9/26 | (2006.01) |
| F21V 7/00 | (2006.01) |
| F21V 29/65 | (2015.01) |
| F21V 3/00 | (2015.01) |
| F21V 17/10 | (2006.01) |

(52) U.S. Cl.
CPC ............... *F21V 29/505* (2015.01); *A01G 9/26* (2013.01); *F21V 7/0025* (2013.01); *F21V 29/65* (2015.01); *F21V 3/00* (2013.01); *F21V 17/107* (2013.01)

(58) Field of Classification Search
CPC ......... A01G 9/26; F21V 3/00; F21V 7/0025; F21V 17/107; F21V 29/505; F21V 29/65
See application file for complete search history.

(56) References Cited

U.S. PATENT DOCUMENTS

| D447,272 S | 8/2001 | Smith |
|---|---|---|
| D544,987 S | 6/2007 | Hargreaves |
| D545,484 S | 6/2007 | Hargreaves |
| 7,524,090 B2 | 4/2009 | Hargreaves |
| 7,534,011 B2 | 5/2009 | Townsley |
| 7,641,367 B2 | 1/2010 | Hargreaves et al. |
| D634,468 S | 3/2011 | Hargreaves |
| D634,469 S | 3/2011 | Hargreaves |
| 8,702,283 B2* | 4/2014 | Bradley, Jr. ........... F21V 7/0025 362/218 |
| 2008/0117617 A1 | 5/2008 | Hargreaves et al. |
| 2009/0310373 A1 | 12/2009 | Burkhauser |
| 2010/0277929 A1 | 11/2010 | Hargreaves et al. |

* cited by examiner

*Primary Examiner* — Stephen F Husar
(74) *Attorney, Agent, or Firm* — Hankin Patent Law APC; Kevin Schraven; Jimmy Sauz

(57) ABSTRACT

The invention is a grow light with reflectors that serve to conceal a vacuum air flow system. The air flow system does not interfere with the reflectors, which enables the reflectors to more efficiently reflect light to the plants being grown. The bulb within the grow light may be configured in many different manners, including horizontally, vertically, and diagonally. The grow light may or may not be connected to an air movement system.

20 Claims, 13 Drawing Sheets

CONCEALED VACUUM AIR FLOW REFLECTOR LIGHT FIXTURE

CROSS-REFERENCE TO RELATED APPLICATIONS

This Application is a continuation-in-part of U.S. patent application Ser. No. 13/106,772, now U.S. Pat. No. 8,702,283, filed on May 12, 2011, titled "Concealed Vacuum Air Flow Reflector Light Fixture," by co-inventors Aubrey Ray Bradley Jr. and Robert Gordon Andersen, the contents of which are expressly incorporated herein by this reference and to which priority is claimed. U.S. Pat. No. 8,702,283 which claims priority to U.S. Provisional Patent Application Ser. No. 61/451,892 filed on Mar. 11, 2011, titled "Concealed Vacuum Air Flow Reflector Light Fixture," by co-inventors Aubrey Ray Bradley Jr. and Robert Gordon Andersen, the contents of which are expressly incorporated herein by this reference.

FIELD OF INVENTION

The invention is a device, method, and system for reflecting light. More particularly, the invention relates to a reflecting and magnifying light fixture with a concealed vacuum air flow system and duct.

BACKGROUND

For decades, grow lights have been used by gardeners to grow plants within the convenience of the home. A grow light is an electric light or lamp that is designed to stimulate plant growth by emitting an electromagnetic spectrum appropriate for photosynthesis. Typically, the lights provide light in a spectrum that is similar to what is delivered from the sun. Outdoor sun conditions are replicated within an indoor space via lamps and lights with varying lumen, temperature, and output. Indoor growing is becoming more and more important because of urban sprawl and the continuing commercial development of farmland. Further, indoor growing has fewer pesticides due to better pest control indoors.

One of the major challenges facing those using grow lights is that the closer the light is to the plant, the more heat the plant receives, but the farther away the light is to the plant, the less light the plant receives. This has led to numerous techniques and devices to try to use the light generated as efficiently as possible, so that the plant can be placed some distance away from the light so that it is not damaged by the heat generated by the bulb.

One of the most common devices to optimize the efficiency of the light is the use of reflectors or magnifying systems. Other techniques include grouping plants and/or lights closely together to minimize the light that does not hit the plants or covering the growing room or box with reflective material.

Current grow lights are limited because the reflector systems are not efficient and/or they give off an immense and detectable heat signature. In order to reduce the detectable heat signature of the light, and to extend the life of the bulb, air flow systems are used to disipate the heat generated by the grow light. Unfortunately, the air flow system itself interferes with the reflecting system and causes inefficiencies.

Thus, what is needed is a grow light with a reflector and a concealed vacuum air flow system that overcomes these limitations.

SUMMARY OF THE INVENTION

To minimize the limitations in the prior art, and to minimize other limitations that will become apparent upon reading and understanding the present specification, the present invention is grow light with an efficient reflector and a concealed vacuum air flow system.

One embodiment may be a light fixture, comprising: a hood; one or more reflectors; one or more light sources; a front covering; wherein the hood is comprised of a plurality of openings and an interior surface; wherein the plurality of hood openings is comprised of a front opening and one or more duct openings; wherein the one or more reflectors are positioned between the interior surface of the hood and the one or more light sources such that a light emitted by the one or more light sources is substantially prevented from reaching an interior surface of the hood and wherein the light is substantially reflected by the one or more reflectors out of the front opening; wherein the one or more positioned reflectors creates a front light area and a back dark area in the hood; wherein the one or more reflectors have a plurality of concealed openings that allow the passage of air between the back dark area and the front light area; wherein the one or more duct openings are connected to an air flow system that causes air to flow into and out of the hood; wherein the front covering is transparent; wherein the one or more reflectors generally have a curved concave shape; and wherein the one or more light sources are not in a horizontal position. The one or more light sources may be comprised of a light bulb socket and a light bulb. The plurality of concealed openings may comprise a concealed socket opening and one or more concealed corner openings; wherein the concealed socket opening may be adapted to fit around the light bulb socket such that when the light bulb is connected so the light bulb socket, the socket concealed opening may be substantially concealed from view. The one or more reflectors may be further comprised of one or more corner reflectors; wherein the one or more corner reflectors may be positioned to substantially conceal one or more concealed corner openings. The light fixture may promote the growth of plants. The one or more reflectors may be scored. The one or more reflectors may be pitted. The one or more corner reflectors may be pitted.

Another embodiment may be a light fixture, comprising: a hood; one or more reflectors; one or more light sources; wherein the hood is comprised of a plurality of openings and an interior surface; wherein the plurality of hood openings is comprised of a front opening and one or more duct openings; wherein the one or more reflectors are positioned between the interior surface of the hood and the one or more light sources such that a light emitted by the one or more light sources is substantially prevented from reaching an interior surface of the hood and wherein the light is substantially reflected by the one or more reflectors out of the front opening; wherein the one or more positioned reflectors creates a front light area and a back dark area in the hood; wherein the one or more reflectors have a plurality of concealed openings that allow the passage of air between the back dark area and the front light area; and wherein the one or more reflectors generally have a curved concave shape. The fixture may further comprise: one or more removable duct connectors; wherein the one or more removable duct connectors are configured to substantially cover the one or more duct openings. Alternatively, the fixture may further comprise: one or more removable grates; wherein the one or more removable grates are configured to substantially cover the one or more duct openings. Alternatively, the fixture may further comprise: one or more removable grates; wherein the one or more removable grates are configured to fit between the one or more duct openings and the one or more removable duct connectors, and are configured to substantially cover the one or more duct openings. The one or more light sources may be comprised of a light bulb socket and a light bulb. The plurality of concealed openings may comprise a concealed socket opening and one or more concealed corner openings; wherein the concealed socket opening is adapted to fit around the light bulb socket such that when the light bulb is connected so the light bulb socket, the socket concealed opening is substantially concealed from view. The one or more reflectors may be further comprised of one or more corner reflectors; wherein the one or more corner reflectors may be positioned to substantially conceal one or more concealed corner openings. The one or more reflectors may be scored. The one or more reflectors may be pitted. The one or more corner reflectors may be pitted. The one or more duct openings may be connected to an air flow system that causes air to flow into and out of the hood. The fixture may further comprise a front covering, which may be transparent.

Another embodiment of the invention may be a light fixture comprising: a hood; one or more reflectors; and one or more light sources. The hood may be comprised of a plurality of openings and an interior surface. The plurality of hood openings may comprise a front opening and one or more duct openings. The one or more reflectors may be positioned between the interior surface of the hood and the one or more light sources such that a light emitted by the one or more light sources may be substantially prevented from reaching an interior surface of the hood and wherein the light may be substantially reflected by the one or more reflectors out of the front opening. The one or more positioned reflectors may create a front light area and a back dark area in the hood. The one or more reflectors may have a plurality of concealed openings that allow the passage of air between the back dark area and the front light area. The one or more duct openings may be connected to an air flow system that causes air to flow into and out of the hood. The light fixture may also comprise a front covering, which may be transparent. The front covering may also create an air flow chamber within the hood. The reflectors may have a curved concave shape to maximize the efficiency of the reflectors. The one or more light sources may comprise a light bulb socket and a light bulb. The concealed openings may comprise a concealed top opening, a concealed socket opening, and one or more concealed corner openings. The concealed socket opening may be adapted to fit around the light bulb socket such that when the light bulb is connected to the light bulb socket, the concealed socket opening is substantially concealed from view. The reflectors may comprise a top reflector, which may be positioned to substantially conceal the concealed top opening. The top reflector may be tilted to reflect the light around the light bulb and to prevent the light from reflecting back to the light bulb, thus cancelling that light out. The reflectors may also comprise one or more corner reflectors, which may be positioned to substantially conceal one or more concealed corner openings. The primary purpose of the light fixture is to promote the growth of plants. The light fixture may also comprise a power source or power adapter. The light fixture may be suspended using a suspension device. The front covering is typically a hinged door that when opened allows access to the light bulb.

Another embodiment of the invention may be a light fixture, comprising: a hood; one or more reflectors; one or more light sources; a front covering; wherein the hood may be comprised of a plurality of openings and an interior surface; wherein the plurality of hood openings may be comprised of a front opening and one or more duct openings; wherein the one or more reflectors may be positioned between the interior surface of the hood and the one or more light sources such that a light emitted by the one or more light sources may be substantially prevented from reaching an interior surface of the hood and wherein the light may be substantially reflected by the one or more reflectors out of the front opening; wherein the one or more positioned reflectors may create a front light area and a back dark area in the hood; wherein the one or more reflectors may have a plurality of concealed openings that allow the passage of air between the back dark area and the front light area; wherein the one or more duct openings may be connected to an air flow system that causes air to flow into and out of the hood; wherein the front covering may be transparent; wherein the one or more reflectors may have a curved concave shape; wherein the one or more light sources is not in a horizontal position. The one or more light sources may be comprised of a light bulb socket and a light bulb. The light fixture may further comprise a removable duct connector, wherein the removable duct connector may comprise: an attachment plate portion; one or more removable duct connector attachment holes; and a tubular opening portion; wherein the removable duct connector attachment holes may be located on the attachment plate portion; wherein the tubular opening portion may be located on the attachment plate portion; wherein the removable duct connector may be placed such that the tubular opening portion substantially lines up with the one or more duct openings. The light fixture may further comprise: a grate; wherein the grate may comprise: a flat plate, one or more vent openings; and one or more grate attachment holes; wherein the grate may be located between the removable duct connector and the one or more duct openings. The one or more reflectors may further contain waffling; wherein the waffling may be formed by scratching or scoring.

Another embodiment of the invention may be a light fixture comprising: a hood; a front covering; a light bulb; a light bulb socket; and a plurality of reflectors. The plurality of reflectors may comprise a top reflector, a plurality of curved side reflectors, and a plurality of curved concealing corner reflectors. The hood may be substantially hollow and have a front opening, an air flow duct inlet opening, an air flow duct outlet opening, and an interior surface. The curved side reflectors may be positioned within the hollow hood between the interior surface of the hood and the light bulb such that a light emitted by the light bulb is substantially prevented from reaching, (1) the interior surface of the hood, (2) the air flow duct outlet opening, and (3) the air flow duct inlet opening. Instead, the light is substantially reflected by the plurality of reflectors out of the front opening. The side reflectors may be positioned within the hollow hood such that there is a top opening and a plurality of corner openings between the plurality of side reflectors. The curved concealing corner reflectors may be positioned within the hollow hood to conceal the plurality of corner openings such that a plurality of concealed corner openings are created, and wherein air is permitted to flow through the plurality of concealed corner openings. The top reflector may be positioned within the hollow hood so as to conceal the top opening such that a concealed top opening is created, and wherein air is permitted to flow through the concealed top opening. The air flow duct inlet opening and the air flow duct outlet opening are connected to an air flow system that causes air to flow into the air flow duct inlet opening and causes air to flow out of the air flow duct outlet opening. The front covering may be transparent and creates an air flow chamber within the hollow hood. The curved side reflectors and curved concealing corner reflectors may be substantially concave. In order to accommodate the light bulb and light bulb socket, one of the side reflectors might have a concealed socket opening, which is adapted to fit around the light bulb socket such that when the light bulb is connected to the light bulb socket, the concealed socket opening is substantially concealed. The top reflector may be tilted in a "v" shape to reflect the light around the light bulb and to prevent the light from reflecting back to the light bulb. The front covering may be a hinged door that when opened, allows access to the light bulb. The light fixture may also comprise a power source, such as a battery or an A/C adapter and a suspension device.

The reflectors may be placed in the hood to optimize the magnification and reflection of the light from the light bulb and yet still allow substantial air flow within the hood. The standard hood may have two duct holes, one to allow air in and the other to allow air out. The holes may be directly across from each other to allow the air to easily flow into and out of the hood. Reflectors may be positioned within a hood such that the air may flow directly through the hood, to the light bulb and then out of the outlet. In the present invention, the reflectors may block the direct flow of air and cause the air to flow through concealed openings to cool the light bulb. When the air is allowed to flow directly through the hood in an unblocked manner, the reflectors may not be placed in the most efficient position to reflect or otherwise magnify the light from the light bulb.

In the present invention, air may be allowed to flow through openings in the reflectors, but the openings may be concealed with other reflectors that block the light from inefficiently escaping into the holes and instead they may reflect the light out of the front opening.

Although the light bulb may be oriented horizontally, the bulb may be oriented vertically, coming down from a top reflector hole. This embodiment may provide a more universal light distribution. In addition to vertical and horizontal orientations, the light bulb may be oriented in any orientation that a light bulb socket may be oriented. This may comprise an infinite amount of diagonal or angled orientations in addition to horizontal and vertical configurations comprising 30 degrees, 45 degrees, and 60 degrees. There may be several benefits to different orientations. Different users may desire different light distributions which may be accomplished with light bulbs of different orientations. Also, different users may have different space concerns and desire that the wiring and positioning of the hood may be influenced by the orientation of the light bulb.

The light fixture of the present invention may enable at least a forty percent (40%) reduction in wattage to be used to generate the same growing power as opposed to currently available light fixtures. This may have several enormously beneficial effects. First, the fixture may be able to generate 40% more light output at the same wattage as currently available light fixtures, which may significantly increase crop yields. Second, the user may use 40% less light fixtures for growing the same number of plants. Third, the invention may have an energy savings of 40% per fixture, which may significantly lower the cost of growing plants. Fourth, these cost savings may enable the price of produce sold by a grower using the present invention to be significantly reduced. Finally, because the light output of each fixture is 40% greater than currently available light fixtures, fewer fixtures may be required to achieve the desired light levels that the plants being grown require. Accordingly, the cost of produce grown using the fixture may be significantly lowered.

The concealed vacuum system of the present invention may also improve safety, because it may drastically lower the temperature of the fixture and lens. Were the temperature of the fixture not lowered by the concealed vacuum system, the heat generated might cause a dry flammable material that contacted the fixture to catch on fire from the excessive heat.

The concealed vacuum system cools the lamp, which may enable the lamp to maintain its original brightness longer, thus saving on maintenance costs and increasing plant yields.

It is an object of the present invention to overcome the limitations of the prior art.

Additional embodiments of the invention will be understood from the detailed description of the invention.

DETAILED DESCRIPTION OF THE DRAWINGS

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the screen shot figures, and the detailed descriptions thereof, are to be regarded as illustrative in nature and not restrictive. Also, the reference or non-reference to a particular embodiment of the invention shall not be interpreted to limit the scope of the invention.

Figure 1:
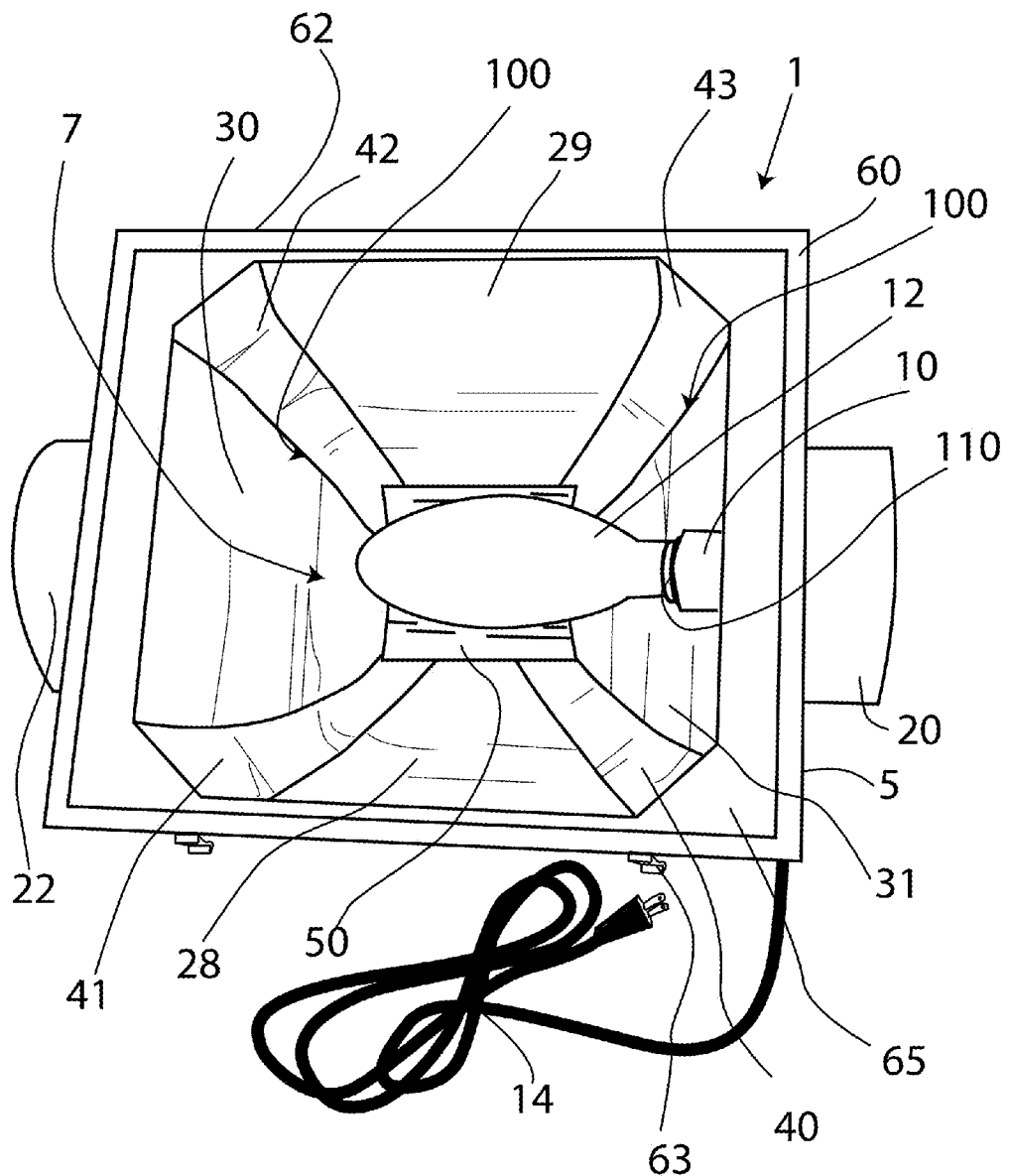
FIG. 1 is an illustration of a front view of one embodiment of the light fixture.

FIG. 1 is an illustration of a front view of one embodiment of the light fixture. As shown in FIG. 1, light fixture 1 may comprise: hood 5, front opening 7, light bulb socket 10, light bulb 12, A/C power adapter 14, air flow duct outlet opening 20, air flow duct inlet opening 22, curved side reflectors 28, 29, 30, and 31, curved concealing corner reflectors 40, 41, 42, and 43, top reflector 50, front covering 60, hinge 62, latch 63, front frame 65, concealed side openings 100, and concealed light bulb socket opening 110. The hood may be any three dimensional shape without deviating from the scope of the invention. FIG. 1 shows how the reflectors may be curved around an interior of the hood such that the light emitted from light bulb 12 may be substantially reflected out through front covering 60. The reflectors may substantially prevent light from reaching the interior of the hood 5. In this manner the light from the light bulb may be used very efficiently. FIG. 1 shows that there may be four curved side reflectors 28, 29, 30, and 31, but any number of reflectors may be used without deviating from the scope of the invention, so long the light is efficiently reflected out of the front opening 7.

Figure 5:
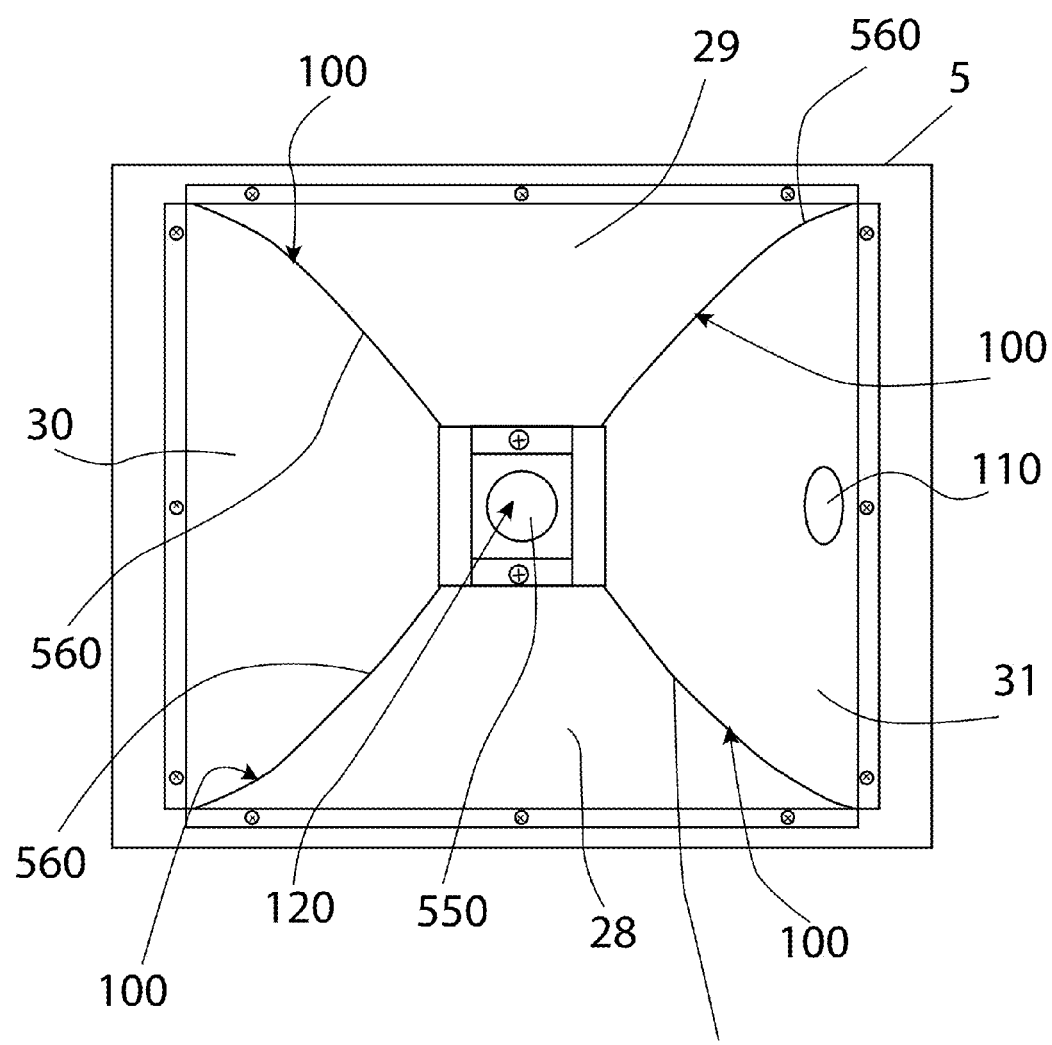
FIG. 5 is an illustration of one embodiment of the light fixture and shows the concealed openings.

FIG. 1 also shows how curved concealing corner reflectors 40, 41, 42, and 43 may cover the joints 560 of the curved side reflectors 28, 29, 30, and 31 and conceal the concealed side openings 100 (the joints 560 of the side reflectors 28, 29, 30, and 31 are shown in FIG. 5). The curved concealing corner reflectors 40, 41, 42, and 43, not only cover the joints 560 and conceal the side openings 110, but they may also smooth out the reflective surface created within the hollow interior of hood 5 and more efficiently reflect light out of front opening 7.

The image of the bulb that is reflected out of the front opening 7 is stretched due to the parabolic nature of the reflector though unbroken vertical lines from the light bulb socket 10 and the images are multiplied and magnified by the segments formed by the unbroken lines within each facet of each reflector 28, 29, 30, 31, 40, 41, 42, 43, and 50. The apertures or concealed openings 100, 110, and 120 may be polygonal and/or elliptical. The concealed openings 100, 110, and 120 may allow hot air to escape the reflector chamber and to be replaced by cool air from the air flow going into and out of the air flow duct outlet and inlet openings 20 and 22. This may keep the area surrounding the light bulb 12 as cool as possible. This may increase the life span of light bulb 12.

The hood may be made out of metal, but any material may be used without deviating from the scope of the invention. The front covering may be transparent glass, but any transparent and heat resistant material may be used. The reflectors may be shined and polished aluminum that is flexible and reflective, but any flexible and reflective material may be used for the reflectors. The light source may be a single light bulb, as shown, but numerous light sockets and light bulbs may be used, as is preferred if light emitting diodes (LED) are used. Any type of lamp, bulb, or light source may be used, including, but not limited to, LED, fluorescent, induction, incandescent, high-output fluorescent, compact fluorescent, high-output fluorescent/high-intensity discharge hybrids, high-pressure sodium (HPS), combination metal halide (MH) and HPS, metal halide, and/or high intensity discharge, without deviating from the scope of the invention.

Light fixture 1 may provide significantly more foot candles on the target zone in front of front covering 60 as compared to currently available grow light fixtures. The light fixture 1 may be placed in any position between vertical or horizontal, relative to the plant being grown. Additionally, the light fixture 1 may be placed at any angle other angle not between vertical or horizontal.

Figure 2:
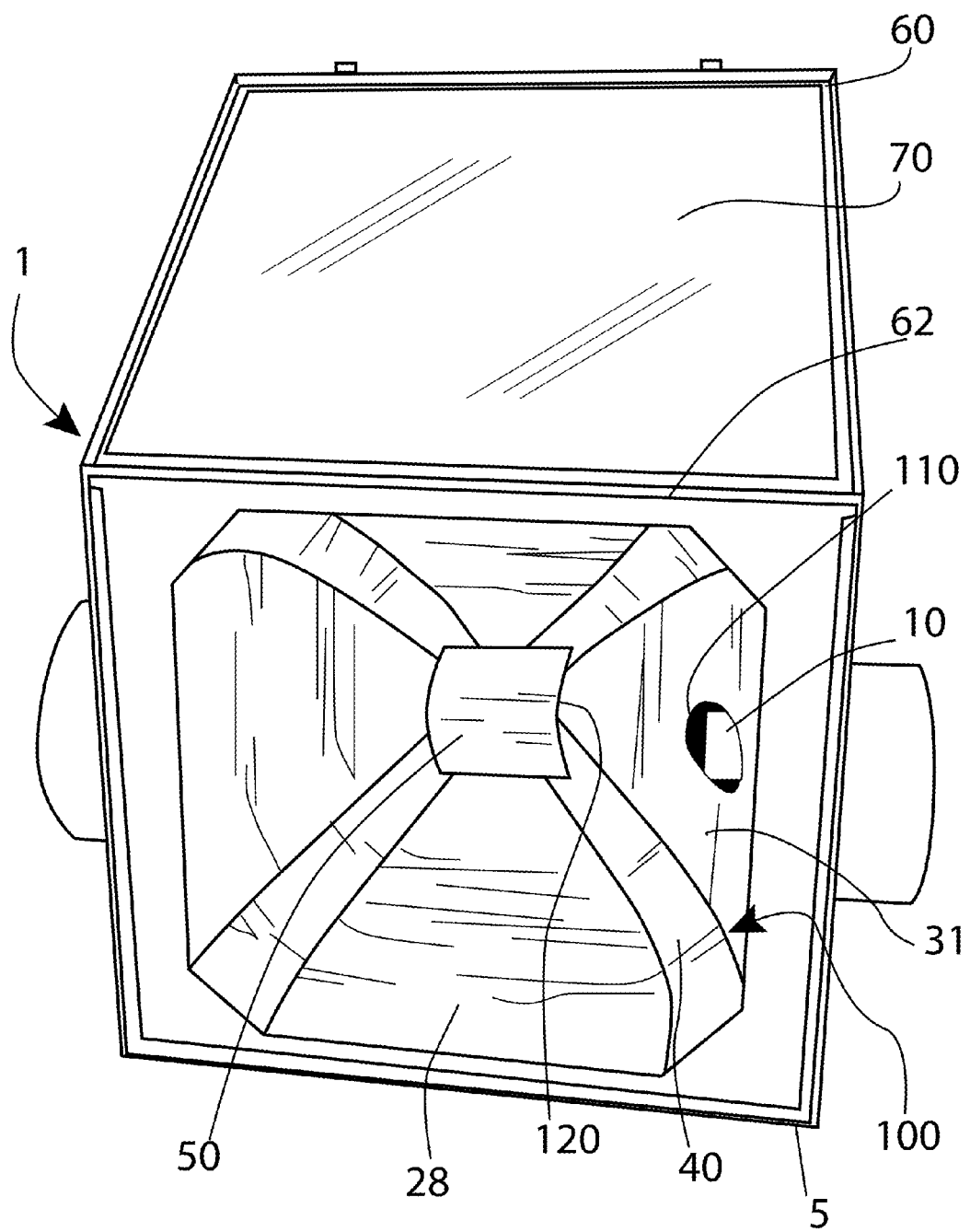
FIG. 2 is an illustration of a front view of one embodiment of the light fixture and shows the front covering open.

FIG. 2 is an illustration of a front view of one embodiment of the light fixture and shows the front covering open. FIG. 2 shows that front covering 60 may be a hinged door that may be opened in order to access the interior of the hood and change or remove the light bulb 12. FIG. 2 also shows how light bulb socket 10 may extend through concealed socket opening 110. When light bulb 12 is connected to socket 10, the socket opening 110 may be substantially concealed.

FIG. 2 also shows that the center or top reflector 50 may be bent or tilted in a v-shape to direct the reflected light away from the bulb and not back into the bulb. This may better enable the light emitted from the back of the bulb to exit out the front opening 7 and not be lost when it is reflected back into the bulb.

Figure 3:
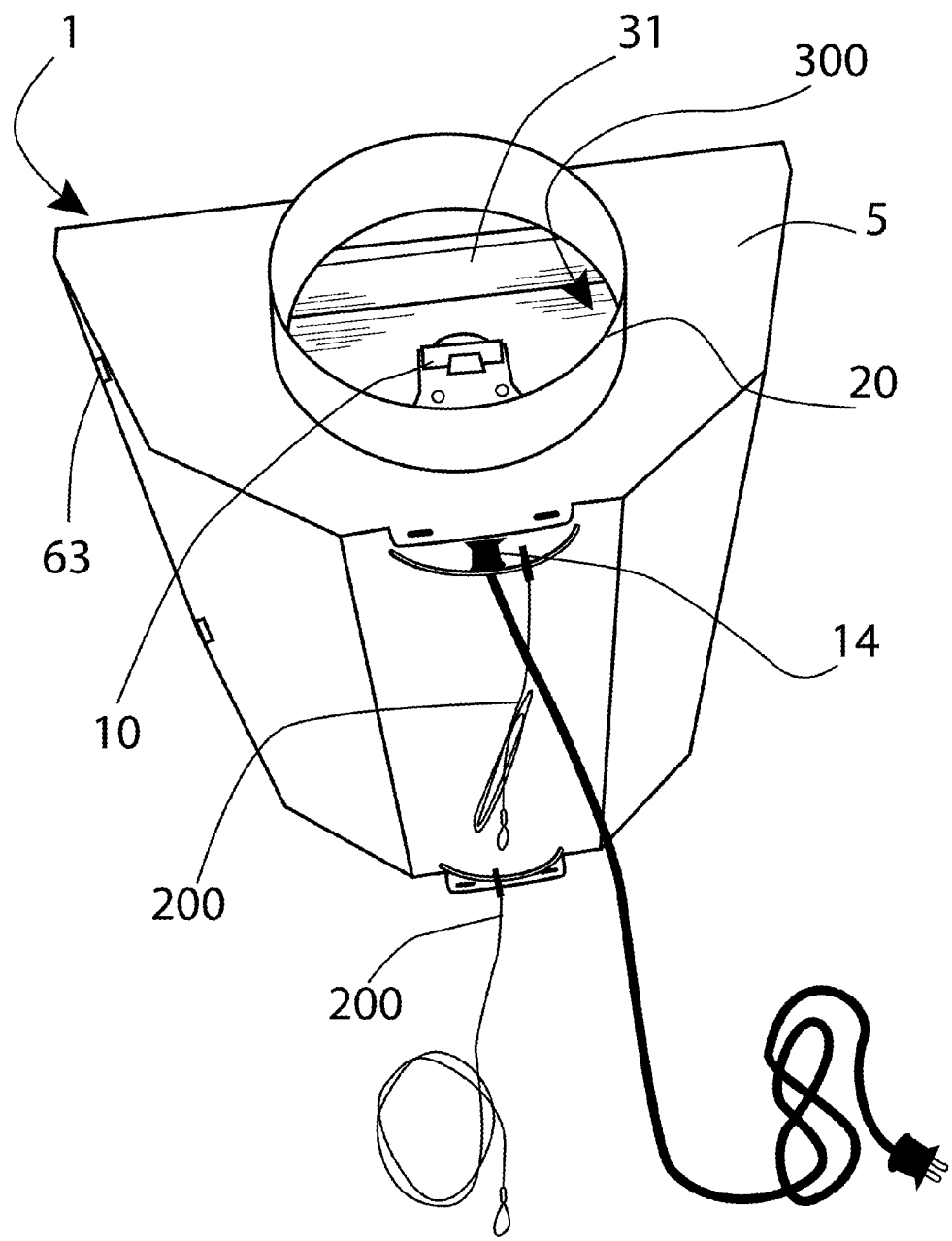
FIG. 3 is an illustration of a back view of one embodiment of the light fixture.

FIG. 3 is an illustration of a back view of one embodiment of the light fixture. As shown in FIG. 3, the light fixture 1 may be comprised of hood 5, light bulb socket 10, A/C adapter 14, air flow duct outlet opening 20, curved side reflector 31, latch 63, suspension device 200, and back dark area 300. FIG. 3 shows how the hood 5 may be powered by connecting to the power grid. However, the hood 5 may be powered through any means, comprising, batteries, outlets, solar panels, and any other energy producing method. The hood 5 may be suspended from a wall or a ceiling using suspension device 200, which, as shown, may be a flexible cable system. Suspension device 200 may be any device that allows the light fixture 1 to be hung or otherwise positioned on a structure. FIG. 3 also shows how light fixture 1 may be easily connected to an air duct system. Latch 63 may be a Nielsen/Session latch as show, but any closure device may be used without deviating from the scope of the invention. FIG. 3 also shows how hood 5 may be a substantially hollow and deep structure that allows room for the air flow, reflectors and light bulbs.

Figure 4:
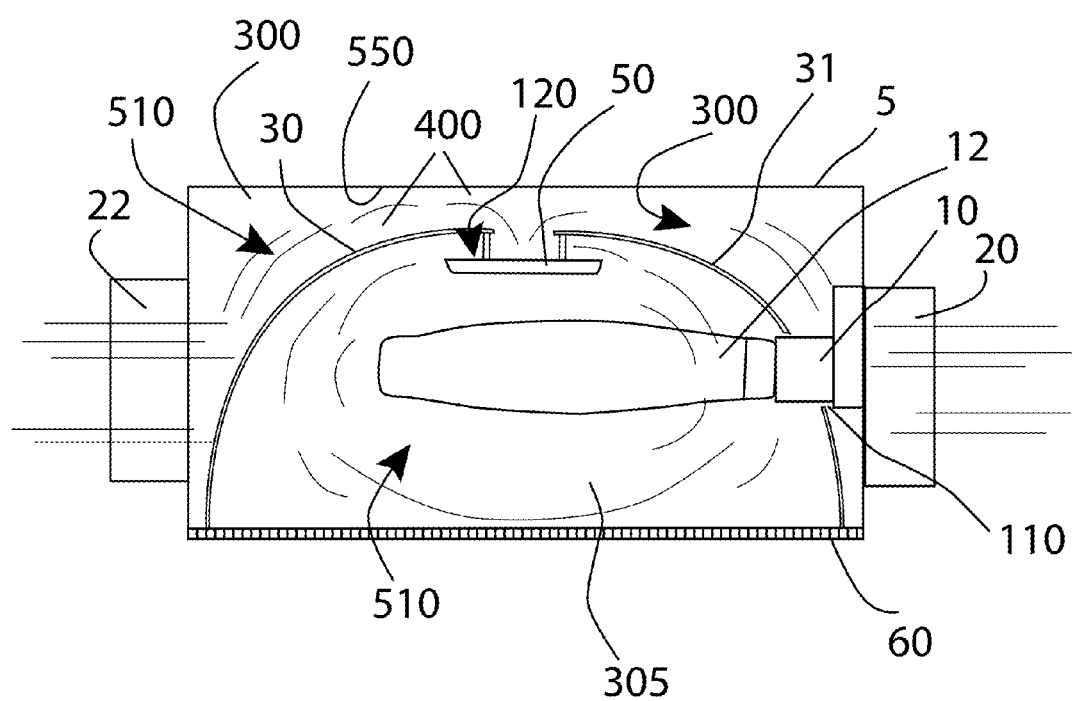
FIG. 4 is an illustration of a cross-section view of one embodiment of the light fixture with a light source in the horizontal position.

FIG. 4 is an illustration of a cross-section view of one embodiment of the light fixture. FIG. 4 shows how the curved side reflectors 30 and 31 may be concave and smooth so as to better reflect the light from light bulb 12 out of the front opening 7. The reflectors may divide the interior space of the hood 5 into a light front area 305 and a dark back area 300. FIG. 4 shows how the concealed openings, including top concealed opening 120, may allow the movement of air 510 within the light fixture 1 so that the light bulb (or lamp) 12 is cooled and heat generated by the light bulb 12 is dissipated out of the air flow duct outlet opening 20. The air 510 may enter through air flow duct inlet opening 22. The air 510 may then be blocked by curved side reflector 30, and forced to go around and/or over the back side of the side reflectors 28, 29, 30, and 31. As shown in FIG. 4, the air 510 may be able to pass through concealed top opening 120 and concealed socket opening 110 to enter into the light front area 305, where it cools the light bulb 12. FIG. 4 shows how top reflector 50 may overlap with the side reflectors to allow the passage of air 510 between the light front area 305 and back dark area 300, while at the same time, substantially prevent the passage of light between the light front area 305 and back dark area 300. The air 510 may then pass out of the light front area 305 through the concealed top opening 120 and concealed socket opening 110. The air 510 may exit the light fixture out of air flow duct outlet opening 20. Although not shown in FIG. 4, the air 510 may also pass into and out of concealed side openings 100. It should be understood that the air flow duct inlet opening 22 and the air flow duct outlet opening 20 may be in any position relative to the reflectors and light source without deviating from the scope of the invention. Front cover 70 may be closed to create an efficient air flow chamber within hood 5. The light fixture 1 may be hooked up to any type of air flow system, so long as cool air is drawn or pushed into the light fixture 1. The air flow system may have a fan within a duct that is downstream from the air flow, which draws air out of the light fixture 1, which in turn creates a creates a vacuum that draws air into light fixture 1.

FIG. 4 also shows an interior surface 550 of hood 5.

FIG. 5 is an illustration of one embodiment of the light fixture and shows the concealed openings. As shown in FIG. 5, when top reflector 50 and curved concealing corner reflectors 40, 41, 42, and 43 are removed, the concealed openings may be visible. The concealed openings may increase the efficiency of the reflecting system while at the same time allowing the vacuum air flow system to cool the light bulb 12. As shown in FIG. 5, the curved side reflectors 28, 29, 30, and 31 may be substantially pyramid shaped parabolic segmented reflectors, which magnify and multiply the light output.

Without the corner reflectors 40, 41, 42, and 43, the joints 560 between the side reflectors are visible. Although these joints 560 may be substantially airtight, they may not be airtight, and act as concealed side openings 100, which may allow air 510 to pass through. When top reflector 50 is absent the top concealed opening 120 may be visible. The interior surface 550 of hood 5 may also be visible.

As shown in FIG. 1, with the curved concealing corner reflectors 40, 41, 42, and 43, the joints 560 between the side reflectors are not visible. The curved concealing corner reflectors 40, 41, 42, and 43, may overlap with the curved side reflectors 28, 29, 30, and 31 to create concealed side openings 100 that allow the flow of air 510, and may create a seamless reflecting system that efficiently reflects light to the front opening 7.

Figure 6:
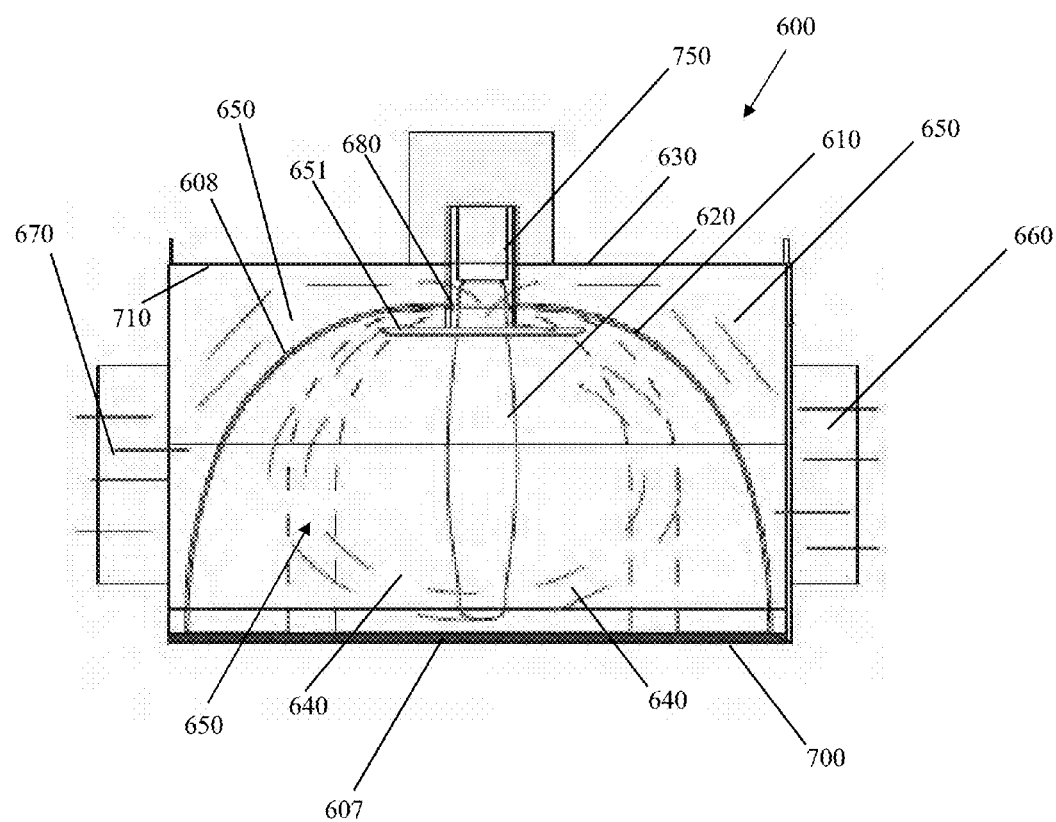
FIG. 6 is an illustration of a cross-section view of one embodiment of the light fixture with the light source attached in a vertical position.

FIG. 6 is an illustration of a cross-section view of one embodiment of the light fixture with the light source attached in a vertical position. As shown in FIG. 6, the light fixture 600 may have a vertical light bulb. Light fixture 600 may comprise front opening 607, side reflectors 608 and 610, light bulb 620, hood 630, top reflector 651, air flow duct outlet opening 660, air flow duct inlet opening 670, concealed socket opening 680, front cover 700, an interior surface 710, and light bulb socket 750. FIG. 6 shows how the curved side reflectors 608 and 610 may be concave and smooth so as to better reflect the light from light bulb 620 out of the front opening 607. The reflectors 608, 610 may divide the interior space of the hood 630 into the light front area 640 and the dark back area 650. FIG. 6 shows how the concealed openings, including the concealed socket opening 680, may allow the movement of air 650 within the light fixture 600 so that the light bulb (or lamp) 620 is cooled and heat generated by the light bulb 620 may be dissipated out of the air flow duct outlet opening 660. The air 650 may enter through the air flow duct inlet opening 670. The air 650 may then be diverted by curved side reflector 608, and forced to go around and/or over the back side of the side reflectors 608. As shown in FIG. 6, the air 650 may be able to pass through concealed socket opening 680 to enter into the light front area 640, where it may cool the light bulb 620.

The light fixture 600 may have concealed side openings 721, 722, 723, 724 (shown in FIG. 7), which may allow air 650 to flow between the light front area 640 and back dark area 650, where it cools the light bulb 620. The air 650 may then exit out of the light front area 640 out of air flow duct outlet opening 660. Although not shown in FIG. 6, the air 650 may also pass out of concealed side openings 721, 722, 723, 724. The air flow duct inlet opening 670 and the air flow duct outlet opening 660 may be in any position relative to the reflectors and light source without deviating from the scope of the invention. Front cover 700 may be closed to create an efficient air flow chamber within hood 630. The light fixture 600 may be hooked up to any type of air flow system, so long as cool air is drawn or pushed into the light fixture 600. The air flow system may have a fan within a duct that flows horizontally, which draws air out of the light fixture 600, which in turn may create a vacuum that draws air into light fixture 600.

Figure 7:
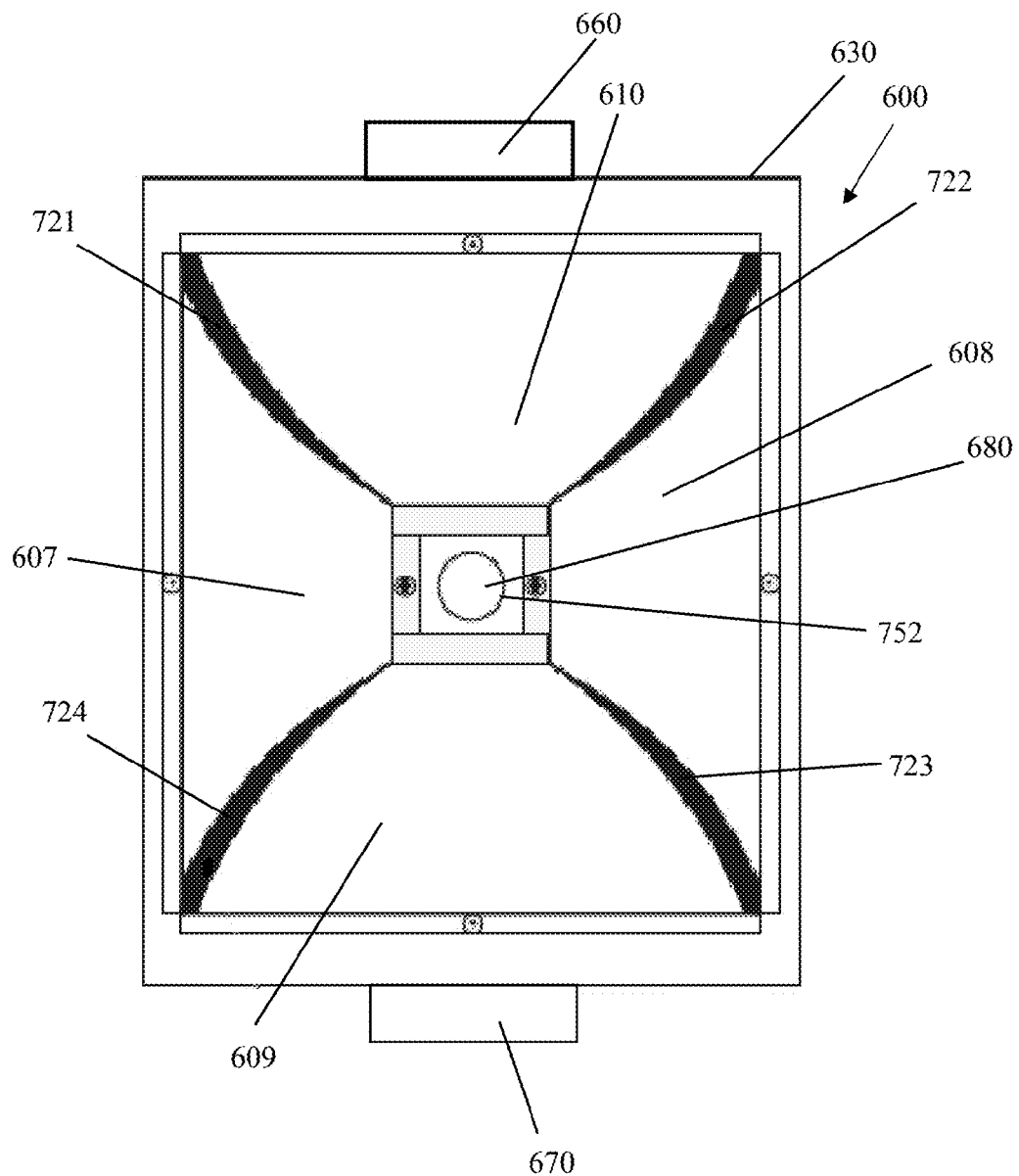
FIG. 7 is an illustration of a rear view of one embodiment of the light fixture for a light source attached in a vertical position.

FIG. 7 is an illustration of a rear view of one embodiment of the light fixture for a light source attached in a vertical position. As shown in FIG. 7, the light fixture 600 may have a vertical light bulb orientation. Light fixture 600 may comprise, side reflectors 607, 608, 609, and 610, hood 630, air flow duct outlet opening 660, air flow duct inlet opening 670, concealed socket opening 680, concealed openings 721, 722, 723, and 724, and light bulb socket 750. As shown in FIG. 7, from a rear, back, or top view of the side reflectors 607, 608, 609, and 610, the concealed openings 721, 722, 723, 724 may be visible. The concealed openings 721, 722, 723, 724, which in this vertical light bulb embodiment may be wider than the openings in the horizontal embodiment, may increase the efficiency of the reflecting system while at the same time allowing the vacuum air flow system to cool the light bulb 620. As shown in FIG. 7, the curved side reflectors 607, 608, 609, and 610 may be substantially pyramid shaped parabolic segmented reflectors, which magnify and multiply the light output.

Figure 8:
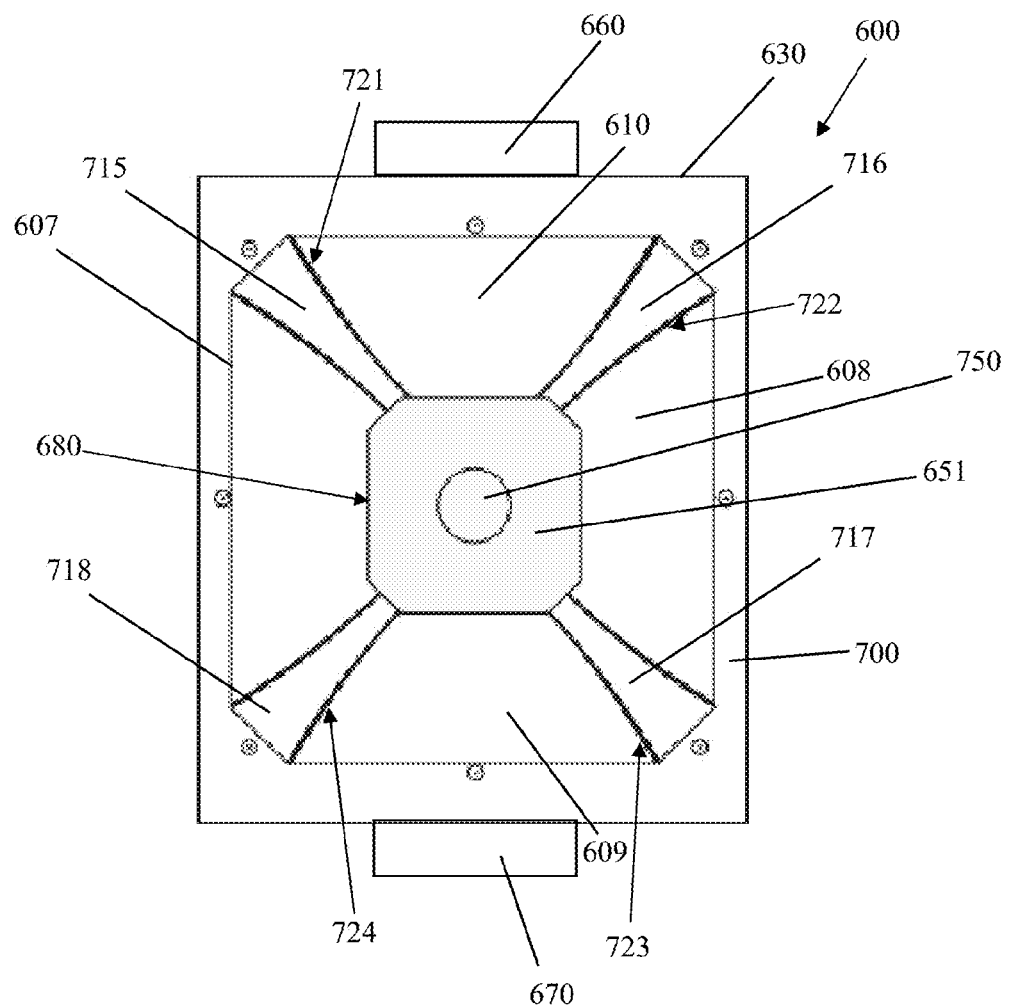
FIG. 8 is an illustration of a front view of one embodiment of the light fixture for a light source attached in the vertical position with the corner reflectors.

FIG. 8 is an illustration of a front view of one embodiment of the light fixture for a light source attached in the vertical position with the corner reflectors. As shown in FIG. 8, the light fixture 600 may have a vertical light bulb orientation. Light fixture 600 may comprise, side reflectors 607, 608, 609, and 610, hood 630, top reflector 651, air flow duct outlet opening 660, air flow duct inlet opening 670, concealed socket opening 680, front cover 700, concealed openings 721, 722, 723, and 724, and light bulb socket 750. FIG. 8 shows concealed socket opening 680, which may allow access to light bulb socket 750. When light bulb 620 is connected to socket 750, the socket opening 680 may be substantially concealed. As shown in FIG. 8, the curved concealing corner reflectors 715, 716, 717, and 718, overlap with the curved side reflectors 607, 608, 609, and 610 to cover the concealed side openings 721, 722, 723, and 724, which may allow the flow of air throughout hood 630, and create a seamless reflecting system that efficiently reflects light to the front opening 607.

Figure 9:
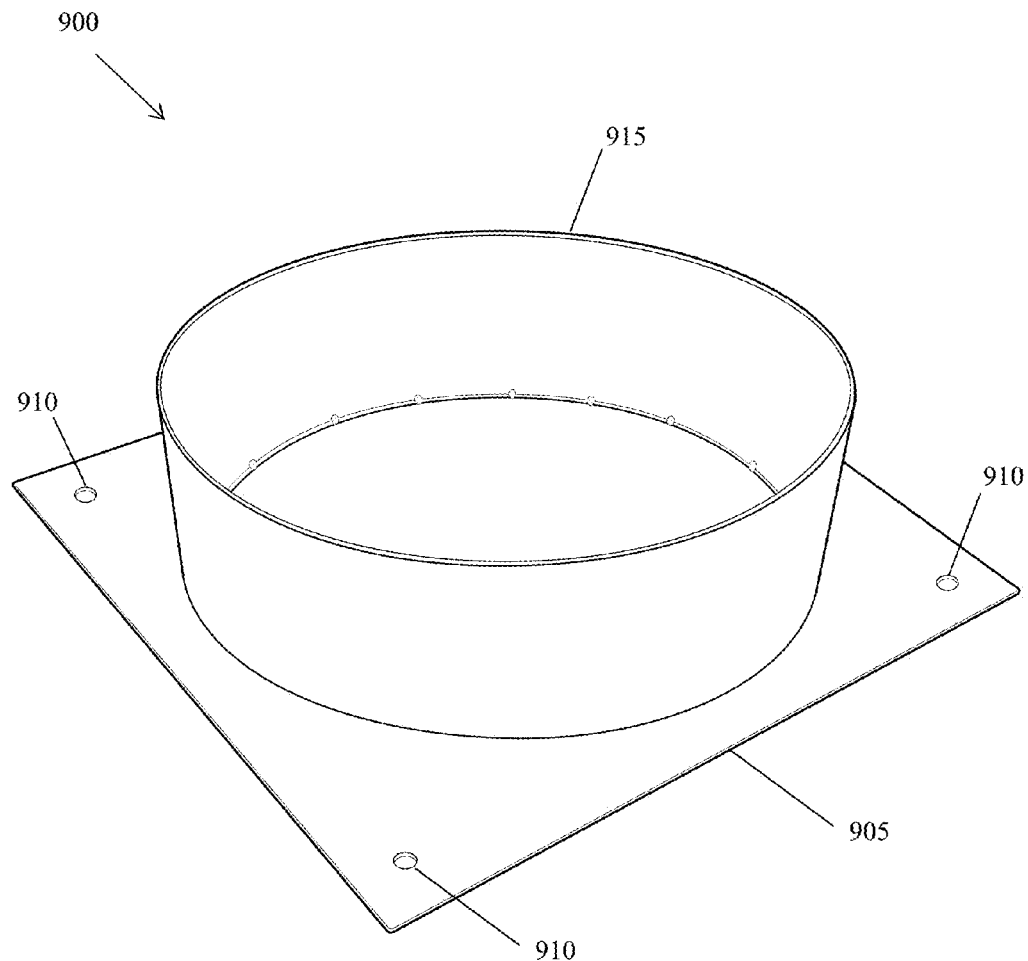
FIG. 9 is an illustration of a perspective view of one embodiment of a removable duct connector.

FIG. 9 is an illustration of a perspective view of one embodiment of a removable duct connector. As shown in FIG. 9, the removable duct connector 900 may comprise: an attachment plate portion 905; removable duct connector attachment holes 910; and a tubular (or cylindrical) opening portion 915. The removable duct connector 900 may be attached to the side of a light fixture to allow an air duct to be easily connected to the light fixture. In one embodiment, the air duct may connect to the tubular opening portion 915 by use of a clamp, adhesive, or other connecting means. The removable duct connector 900 may be attached to the light fixture at a duct opening. In one embodiment, the attachment plate portion 905 may be fastened to a light fixture by lining up the removable duct connector attachment holes 910 with holes on the light fixture and using a screw, bolt, or other attachment means to fasten the removable duct connector 900 to the light fixture. Having a removable duct connector 900 allows the user to remove the duct connector 900 and replace it with a different type of cover, grate, or connector in the event that the fixture is not being hooked up to ducting or an air flow device.

Figure 10:
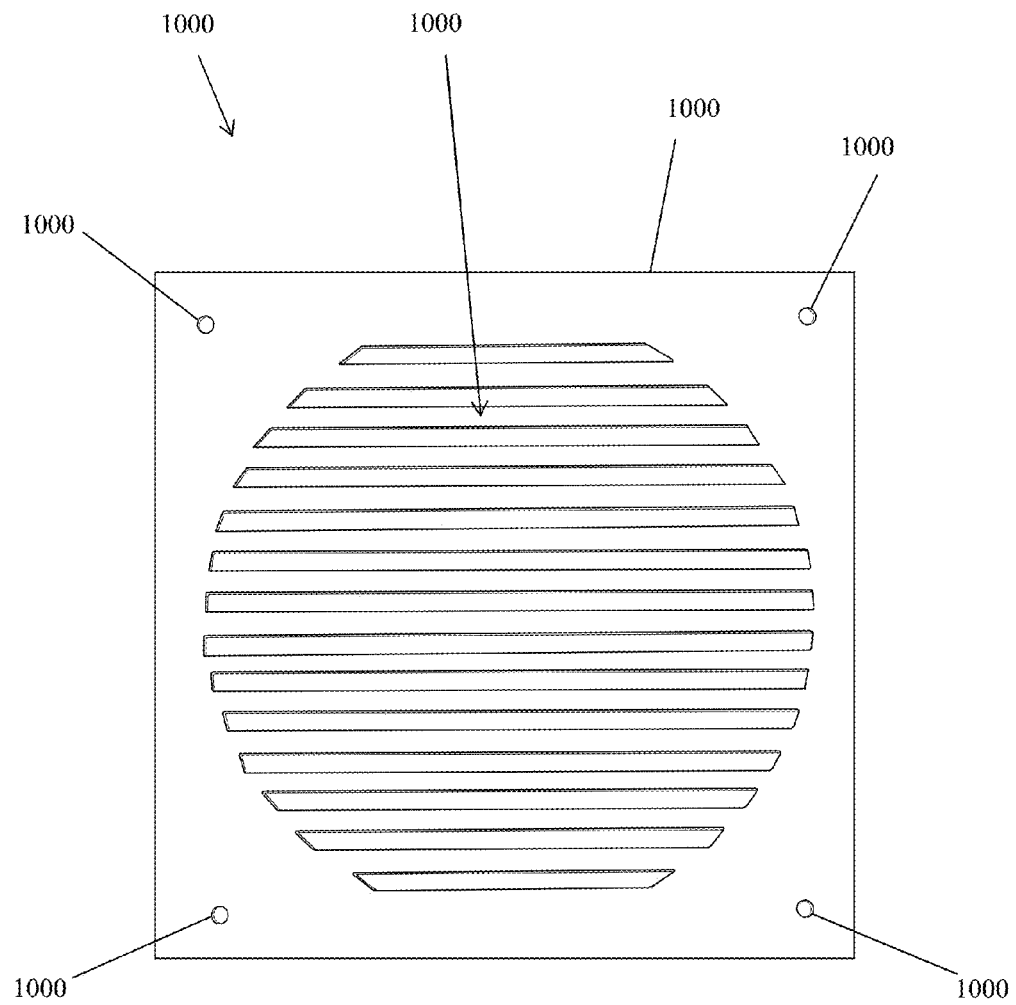
FIG. 10 is an illustration of one embodiment of a grate.

FIG. 10 is an illustration of one embodiment of a grate. As shown in FIG. 10, the grate 1000 may comprise: a flat plate 1005; vent openings 1010; and grate attachment holes 1015. The grate 1000 may be used to prevent debris of various sorts from entering an airway of the light fixture. The flat plate 1005 may contain vent openings 1010 to allow ambient air to flow through while preventing debris larger than the vent openings 1010 from entering the light fixture. The grate may be placed between a removable duct connector 900 and a light fixture by lining up the grate attachment holes 1015 and using a screw, bolt, nail or other connector, to secure the removable duct connector 900, the grate 1000, and the light fixture together. Alternatively, the grate 1000 may be used to cover one or more duct openings on by itself.

Figure 11:
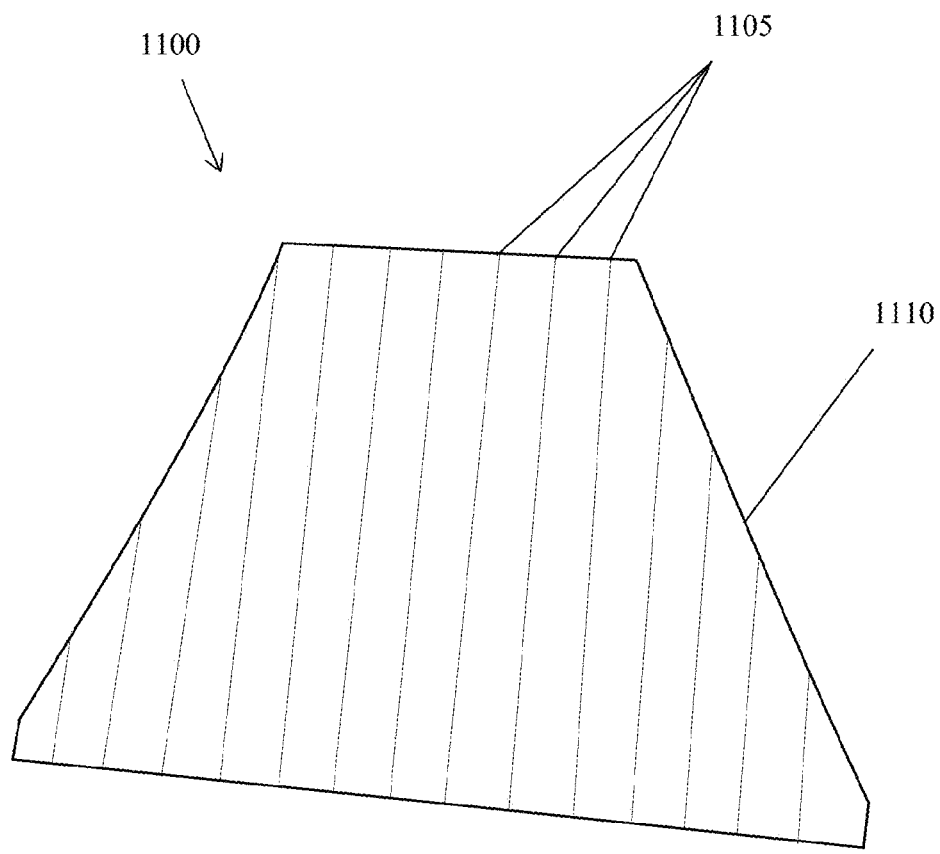
FIG. 11 is an illustration of one embodiment of a scored reflector.

FIG. 11 is an illustration of one embodiment of a scored reflector. As shown in FIG. 11, the scored reflector 1100 may comprise a reflector that has been scored, scratched, or partially cut. In one embodiment, the scoring modifications 1105 are made via scoring or scratching to create additional facets of the reflective surface. The scoring may be done by creating substantially parallel, equidistant, scoring marks running from one end of the scored reflector 1100 to the opposing end. It should be understood that any pattern of scoring may be used without deviating from the scope of the invention. The scored reflector 1100 may be used to line a light fixture to help increase the reflectivity and efficiency of the light fixture.

Figure 12:
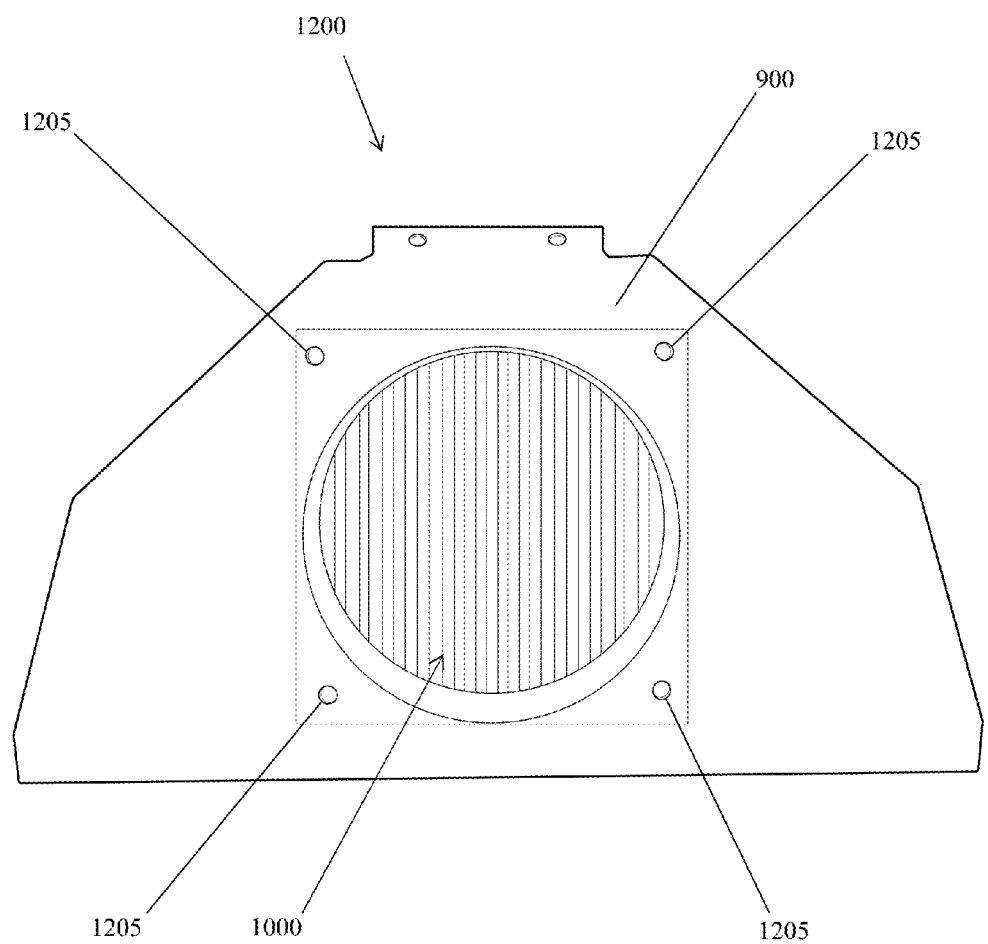
FIG. 12 is an illustration of a side view of one embodiment of the light fixture showing the removeable grate and duct connector.

FIG. 12 is an illustration of a side view of one embodiment of the light fixture showing the removeable grate and duct connector connected to the fixture. FIG. 12 is an illustration of a side view of one embodiment of a light fixture assembly 1200 showing a removable duct connector 900 and a grate 1000 attached to the light fixture 1200. In one embodiment, four connectors 1205 may be used to connect the removable duct connector 900, grate 1000, and light fixture 1200 together. The connectors may be bolts, screws, nails, snaps, fasteners, and the like. An air duct may be attached to the removable duct connector 900 to increase air flow and thereby increases cooling efficiency of the light fixture assembly 1200. The removable duct connector 900 and grate 1000 may also be connected to the light fixture assembly 1200 on another location, such as the opposite side, to provide an air outlet, which may also have an air duct attached.

Figure 13:
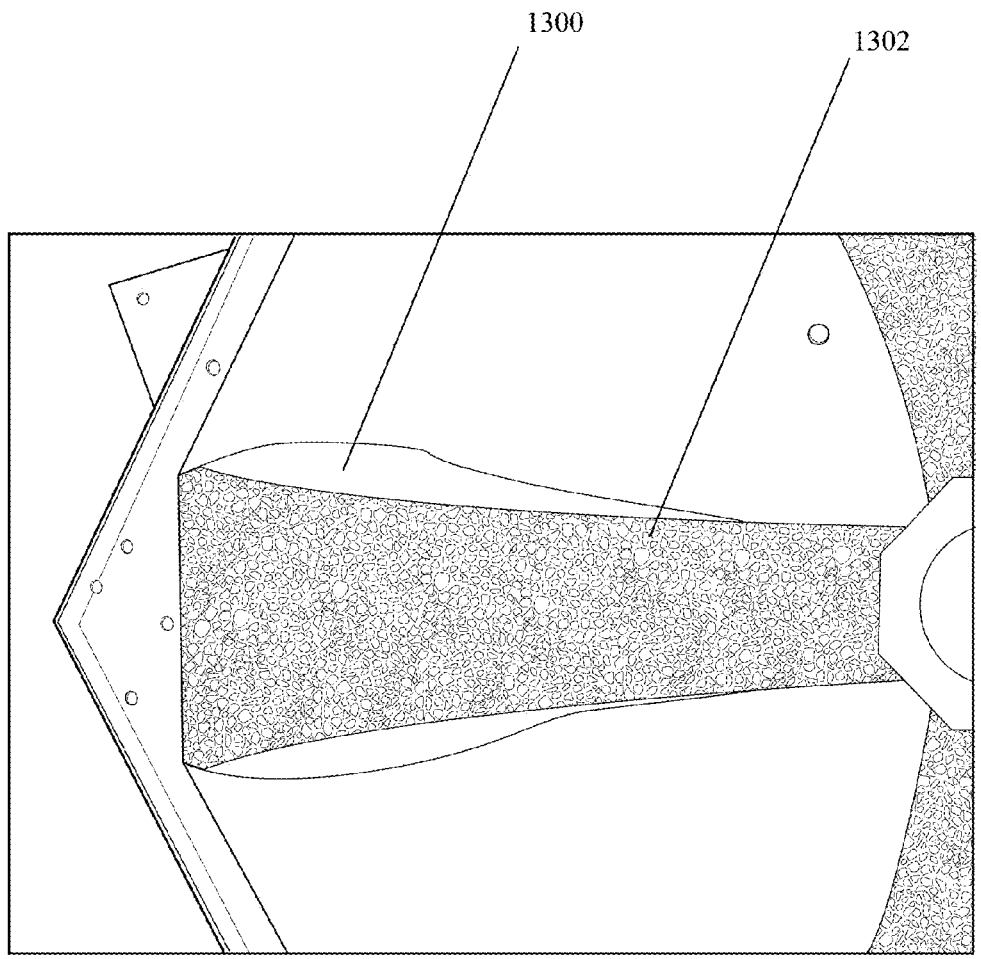
FIG. 13 is an illustration of one embodiment of a pitted reflector

FIG. 13 is an illustration of one embodiment of a pitted reflector. One or more of the reflectors 1300 or side reflectors 1302 may be pitted, textured, stamped or bent in order to reflect and/or refract the light to further improve the efficiency of the fixture.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

What is claimed is:

1. A light fixture, comprising:
a hood;
one or more reflectors;
one or more light sources;
a front covering;
wherein said hood is comprised of a plurality of openings and an interior surface;
wherein said plurality of hood openings is comprised of a front opening and one or more duct openings;
wherein said one or more reflectors are positioned between said interior surface of said hood and said one or more light sources such that a light emitted by said one or more light sources is substantially prevented from reaching an interior surface of said hood and wherein said light is substantially reflected by said one or more reflectors out of said front opening;
wherein said one or more positioned reflectors creates a front light area and a back dark area in said hood;
wherein said one or more reflectors have a plurality of concealed openings that allow the passage of air between said back dark area and said front light area;
wherein said one or more duct openings are connected to an air flow system that causes air to flow into and out of said hood;
wherein said front covering is transparent;
wherein said one or more reflectors generally have a curved concave shape; and
wherein said one or more light sources are not in a horizontal position.

2. The light fixture of claim 1, wherein said one or more light sources is comprised of a light bulb socket and a light bulb.

3. The light fixture of claim 2, wherein said plurality of concealed openings comprise a concealed socket opening and one or more concealed corner openings;
wherein said concealed socket opening is adapted to fit around said light bulb socket such that when said light bulb is connected so said light bulb socket, said socket concealed opening is substantially concealed from view.

4. The light fixture of claim 3, wherein said one or more reflectors are further comprised of one or more corner reflectors;
wherein said one or more corner reflectors are positioned to substantially conceal one or more concealed corner openings.

5. The light fixture of claim 4, wherein said light fixture promotes the growth of plants.

6. The light fixture of claim 1, wherein said one or more reflectors are scored.

7. The light fixture of claim 4, wherein said one or more reflectors are pitted.

8. The light fixture of claim 4, wherein said one or more corner reflectors are pitted.

9. A light fixture, comprising:
a hood;
one or more reflectors;
one or more light sources;
wherein said hood is comprised of a plurality of openings and an interior surface;
wherein said plurality of hood openings is comprised of a front opening and one or more duct openings;
wherein said one or more reflectors are positioned between said interior surface of said hood and said one or more light sources such that a light emitted by said one or more light sources is substantially prevented from reaching an interior surface of said hood and wherein said light is substantially reflected by said one or more reflectors out of said front opening;
wherein said one or more positioned reflectors creates a front light area and a back dark area in said hood;
wherein said one or more reflectors have a plurality of concealed openings that allow the passage of air between said back dark area and said front light area; and
wherein said one or more reflectors generally have a curved concave shape.

10. The light fixture of claim 9, further comprising:
one or more removable duct connectors;
wherein said one or more removable duct connectors are configured to substantially cover said one or more duct openings.

11. The light fixture of claim 9, further comprising:
one or more removable grates.

12. The light fixture of claim 10, further comprising:
one or more removable grates;
wherein said one or more removable grates are configured to fit between said one or more duct openings and said one or more removable duct connectors, and are configured to substantially cover said one or more duct openings.

13. The light fixture of claim 9, wherein said one or more light sources is comprised of a light bulb socket and a light bulb.

14. The light fixture of claim 13, wherein said plurality of concealed openings comprise a concealed socket opening and one or more concealed corner openings;
wherein said concealed socket opening is adapted to fit around said light bulb socket such that when said light bulb is connected so said light bulb socket, said socket concealed opening is substantially concealed from view.

15. The light fixture of claim 9, wherein said one or more reflectors are further comprised of one or more corner reflectors;
wherein said one or more corner reflectors are positioned to substantially conceal one or more concealed corner openings.

16. The light fixture of claim 9, wherein said one or more reflectors are scored.

17. The light fixture of claim 15, wherein said one or more reflectors are pitted.

18. The light fixture of claim 15, wherein said one or more corner reflectors are pitted.

19. The light fixture of claim 9, wherein said one or more duct openings are connected to an air flow system that causes air to flow into and out of said hood.

20. The light fixture of claim 19, further comprising a front covering.

* * * * *